United States Patent [19]

Funahashi et al.

[11] Patent Number: 5,725,383
[45] Date of Patent: Mar. 10, 1998

[54] DATA TRANSMISSION SYSTEM

[75] Inventors: Yasuhiro Funahashi; Kazunori Ikami; Osamu Nishimura; Yuji Kiyohara, all of Nagoya; Yoshihiko Hibino, Gifu-ken; Yuichi Yasutomo, Nagoya, all of Japan

[73] Assignees: Brother Kogyo Kabushiki Kaisha; Xing Inc., both of Nagoya, Japan

[21] Appl. No.: 721,273

[22] Filed: Sep. 26, 1996

Related U.S. Application Data

[63] Continuation of Ser. No. 275,424, Jul. 15, 1994, abandoned.

[30] Foreign Application Priority Data

Jul. 16, 1993 [JP] Japan .................. 5-177014

[51] Int. Cl.$^6$ .................. G09B 15/06; G10H 7/00
[52] U.S. Cl. .................. 434/307 A; 454/307 R; 455/6.3; 340/825.08; 370/494; 84/609; 84/477 R
[58] Field of Search .................. 434/307 R–309, 434/318, 365; 379/92, 93, 96–98; 375/8; 348/478–484, 488, 552, 571, 678; 360/1.9, 33.1, 32, 49, 69, 70, 77.01, 98.04; 386/55, 97, 105; 369/22, 34, 48, 50, 83, 178, 192; 84/477 R, 601, 603, 609, 610, 625, 630, 631, 634, 645; 381/81; 395/806, 807, 12, 880; 455/4.1, 5.1, 6.1, 4.2, 6.3; 340/825.08; 370/449

[56] References Cited

U.S. PATENT DOCUMENTS

| | | |
|---|---|---|
| 3,859,596 | 1/1975 | Jannery et al. . |
| 4,168,532 | 9/1979 | Dempsey et al. . |
| 4,896,209 | 1/1990 | Matsuzaki et al. .................. 348/8 |
| 4,926,255 | 5/1990 | Von Kohorn .................. 379/92 X |
| 5,153,917 | 10/1992 | Kato .................. 380/3 |
| 5,194,682 | 3/1993 | Okamura et al. .................. 434/307 A |
| 5,247,126 | 9/1993 | Okamura et al. .................. 434/307 A |
| 5,250,747 | 10/1993 | Tsumura .................. 434/307 A |
| 5,335,073 | 8/1994 | Yamamoto .................. 434/307 A |
| 5,410,097 | 4/1995 | Kato et al. .................. 84/610 |

FOREIGN PATENT DOCUMENTS

| | | |
|---|---|---|
| 2619661 | 2/1989 | France . |
| 2208986 | 4/1989 | United Kingdom . |
| 90/15497 | 12/1990 | WIPO . |

*Primary Examiner*—Joe Cheng
*Attorney, Agent, or Firm*—Oliff & Berridge

[57] ABSTRACT

In a karaoke system, a central terminal and a plurality of karaoke terminals are connected by a coaxial cable. A polling modem modulates a polling signal to a predetermined channel signal and transmits it to a karaoke terminal and also receives a response signal (signal for responding as to whether a song has been requested) transmitted from the karaoke terminal in response to the polling signal. When a song is requested, the data transmission control portion retrieves the karaoke song data of the requested song from the memory, modulates it via the data transmission modem into an alternating current signal that differs from the channel of the polling signal, and transmits it to the karaoke terminal.

4 Claims, 7 Drawing Sheets

| | |
|---|---|
| C30 | POLLING SIGNAL TRANSMISSION |
| C31 | RESPONSE SIGNAL TRANSMISSION |
| C32 | KARAOKE SONG DATA TRANSMISSION |
| C33 | BACKGROUND IMAGE SIGNAL 1 TRANSMISSION |
| C34 | BACKGROUND IMAGE SIGNAL 2 TRANSMISSION |
| C35 | BROADCAST SATELLITE SIGNAL TRANSMISSION |
| C36 | UNOCCUPIED |
| C37 | UNOCCUPIED |
| C38 | UNOCCUPIED |

5,725,383

DATA TRANSMISSION SYSTEM

This is a continuation of application Ser. No. 08/275,424 filed Jul. 15, 1994, now abandoned.

BACKGROUND OF THE INVENTION

1. Field of the Invention

The present invention relates to a data transmission system wherein a central control unit and a plurality of terminals are connected by a transmission line, the data transmission system being for transmitting information data from the central control unit to a terminal.

2. Description of the Related Art

Conventionally, there is known a data transmission system, wherein a center (central control unit) is connected to a plurality of terminals by a transmission line. The data transmission system is for transmitting information data including various types of information from a center to a terminal according to demands from the terminal side. An advantage of this type of data transmission system is that a memory device for prestoring data information need not be provided to each terminal, so that the terminals have an extremely simple construction.

SUMMARY OF THE INVENTION

In the data transmission system, it can be proposed that transmission and reception of the information data is controlled by polling between the center and the terminal. That is, polling signals are transmitted in succession from the center to the plurality of terminals. Every terminal is interrogated to determine whether the each terminal requests transmission of information data. When there is a request for transmission from a terminal that has received the polling signal, the request data, which indicates the content and the like of the request, is transmitted from the terminal to the center. After the request data has been received at the center side, the desired information data is transmitted to the terminal over the channel over which the polling signal has been transmitted.

According to this method, however, a polling signal can not be transmitted from the center while information data is being transmitted to a terminal via the transmission cable. Therefore, this will cause a problem in that the waiting time at a terminal increases and a long time is required for the desired data to be transmitted from the center. Particularly, a large scale system with external transmission lines can have a great many terminals so that information data can not be transmitted quickly to individual terminals.

It is therefore an objective of the present invention to overcome the above-described problems and to provide a data transmission system wherein a terminal can obtain desired information data with a short waiting time.

In order to achieve the above object and other objcts, the present invention provides a data transmission system for controlling transmission of information data via a transmission line from a central control unit to a plurality of terminals. The data transmission system comprises: a central control unit and a plurality of terminals connected to the central control unit via a transmission line. The central control unit includes polling signal transmitting apparatus for successively transmitting polling signals to the plurality of terminals, via the transmission line, over a predetermined channel. Each of the plurality of terminals includes request signal transmitting apparatus for transmitting an information transmission request signal via the transmission line to the central control unit, in response to the received polling signal. When the each terminal desires transmission of an information data from the central control unit. The central control unit further includes data transmission apparatus for transmitting, via the transmission line over a channel different from the channel over which the polling signals are transmitted, the information data to each of the terminals that has transmitted the information transmission request signal.

According to another aspect, the present invention provides a data transmission device for transmitting information data via a transmission line to a plurality of terminals, upon requested by the plurality of terminals. The data transmission device comprises: polling signal transmission apparatus for successively transmitting polling signals to a plurality of terminals over a predetermined channel via a transmission line, to thereby detect whether each of the plurality of terminals desires transmission of information data. The device also includes data transmission apparatus for transmitting, over a channel different from the channel over which the polling signals are transmitted, the information data to each of the terminals that are detected by the polling signals to desire the transmission of the information data.

According to a further aspect, the present invention provides a method of controlling transmission of information data via a transmission line from a central control unit to a plurality of terminals, the plurality of terminals being connected to the central control unit via the transmission line, the method comprising the steps of: successively transmitting polling signals from the central control unit to the plurality of terminals, via the transmission line, over a predetermined channel; transmitting, via the transmission line, an information transmission request signal, from each of the terminals that desires the transmission of the information data, to the central control unit, in response to the received polling signal, the information transmission request signal indicating that the corresponding terminal desires the transmission of the information data from the central control unit; transmitting the information data to each of the terminals that have transmitted the information transmission request signals, via the transmission line, over a channel different from the channel over which the polling signals are transmitted.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
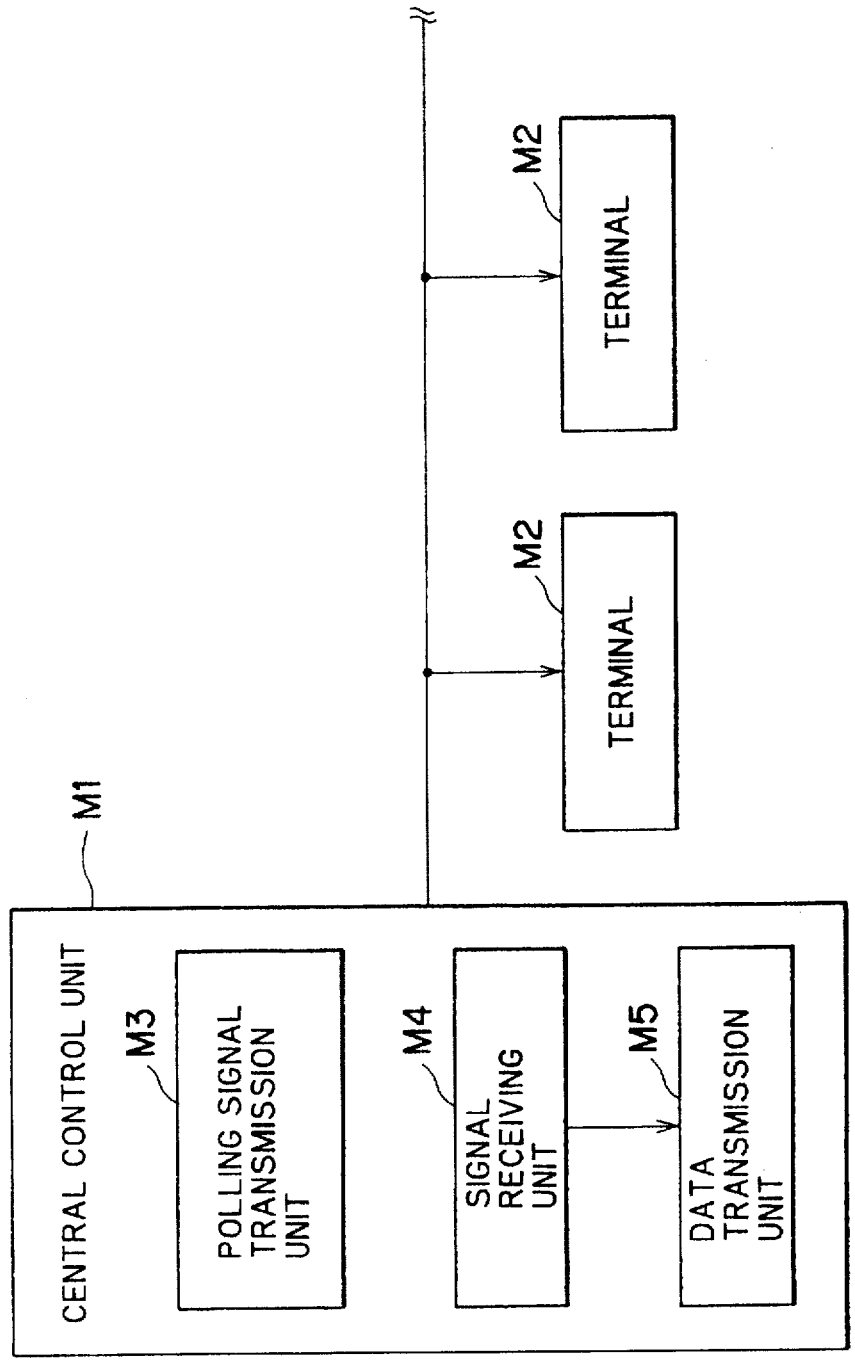
FIG. 1 is a schematic structural diagram showing the basic structure of an embodiment of the present invention.

A data transmission system according to a preferred embodiment of the present invention will be described while referring to the accompanying drawings wherein like parts and components are designated by the same reference numerals as those shown in FIGS. 1 through 8 to avoid duplicating description.

As shown in FIG. 1, a data transmission system of the embodiment of the present invention includes a central control unit M1 and a plurality of terminals M2 connected by a transmission line to the central control unit M1. The data transmission system is for causing the central control unit M1 to selectively transmit desired information data, including image information and/or sound information, to the terminals M2, through polling the terminals. According to the present invention, the central control unit M1 includes: a polling transmission unit M1 for successively transmitting polling signals to the terminals M3 over a predetermined channel; a signal receiving unit M4 for receiving information transmission request signals that have been transmitted from the terminals M2 in response to the polling signals; and a data transmission unit M5 for transmitting information data in accordance with the information transmission request signals to the terminals that have transmitted the information transmission request signals. The data transmission unit M5 transmits the information data over a channel that differs from the channel over which the polling signals are transmitted.

According to the data transmission system of the present invention structured as described above, the polling signal transmission unit M3 in the central control unit M1 transmits polling signals in succession to all the terminals M2 over a predetermined channel. Each terminal M2 transmits a data transmission request signal for requesting transmission of information data, in response to the received polling signal, if the terminal desires the information data transmission. The signal receiving unit M4 receives the data transmission request signals thus transmitted from the terminals M2. The data transmission unit M5 transmits, over a channel that differs from the channel over which the polling signals are transmitted, information data corresponding to the data transmission request signal to a terminal M2 that has transmitted the data transmission request signal.

Thus, transmission of the polling signals and transmission of the information data are performed over different channels. Therefore, the polling signal transmission unit M5 can transmit the polling signals to the terminals M2 even while information data are being transmitted to the terminals. Therefore, polling is not interrupted by transmission of information data. Accordingly, the central control device M1 can be quickly accessed from the terminals M2 and desired information data can be obtained at the terminals with only a short waiting time.

Figure 2:
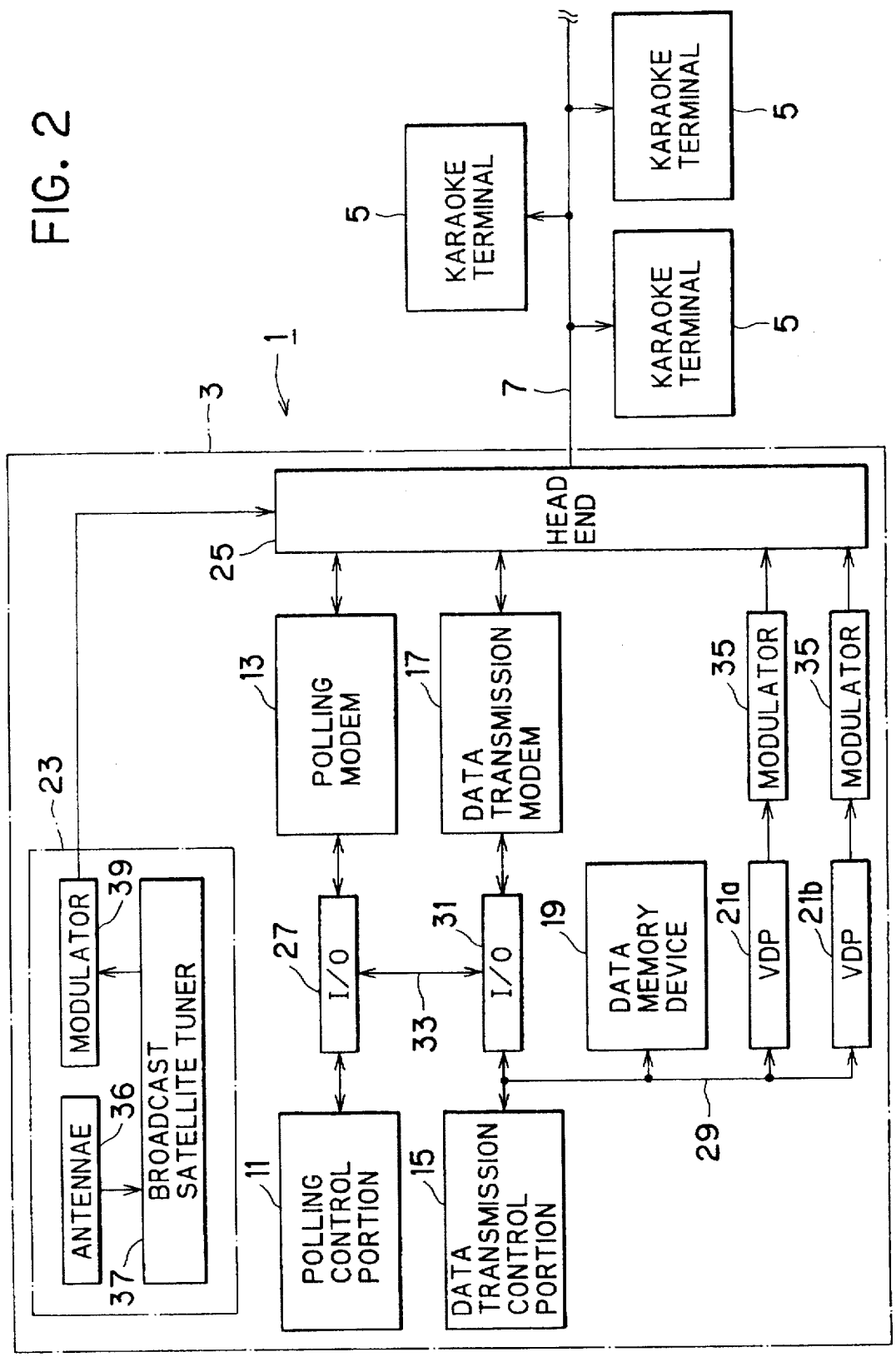
FIG. 2 is a block diagram showing schematic overall structure of a karaoke system and structure of a center of the karaoke system according to a concrete example of the embodiment.

A concrete example of the data transmission system according to the present embodiment will be described below. The concrete example is a karaoke system to which the present embodiment is applied. In the karaoke system of this example, a plurality of karaoke terminals and a center (central control unit) are connected by a transmission line. As shown in FIG. 2, the karaoke system 1 according to this example is constructed from a center 3 connected to a plurality of karaoke terminals 5 by a coaxial cable 7 (transmission line). The karaoke terminals 5 can be provided in separate buildings or in separate establishments or booths within the same building.

The structure of the center 3 will now be described in detail while referring to FIG. 2.

The center 3 includes a polling control portion 11, a polling modem 13, a data transmission control portion 15, a memory device 19 in which a plurality of karaoke song data are stored, background image output devices (VDP) 21a and 21b, a broadcast satellite reception system 23, a head end 25, etc.

The polling controlling portion 11 includes well-known components, such as a central processing unit (CPU), a ROM, and a RAM (not shown), and is connected to the polling modem 13 via an input/output interface (I/O) 27.

The polling control portion 11 is for producing a polling signal added with an address code corresponding to each of the plurality of terminals 5. More specifically, if the total number of the terminals 5 connected to the center 3 is N (integer more than 1), each of the terminals is numbered at a terminal number n (n is an integer number: $1 \leq n \leq N$). The polling control portion 11 produces the N total number of polling signals, each of which is added with an address code indicating the terminal number n. Accordingly, when a polling signal is transmitted via the transmission line to the plurality of karaoke terminal 5, each karaoke terminal 5 refers to this address code to determine whether the polling is for itself.

Figures 4, 5:
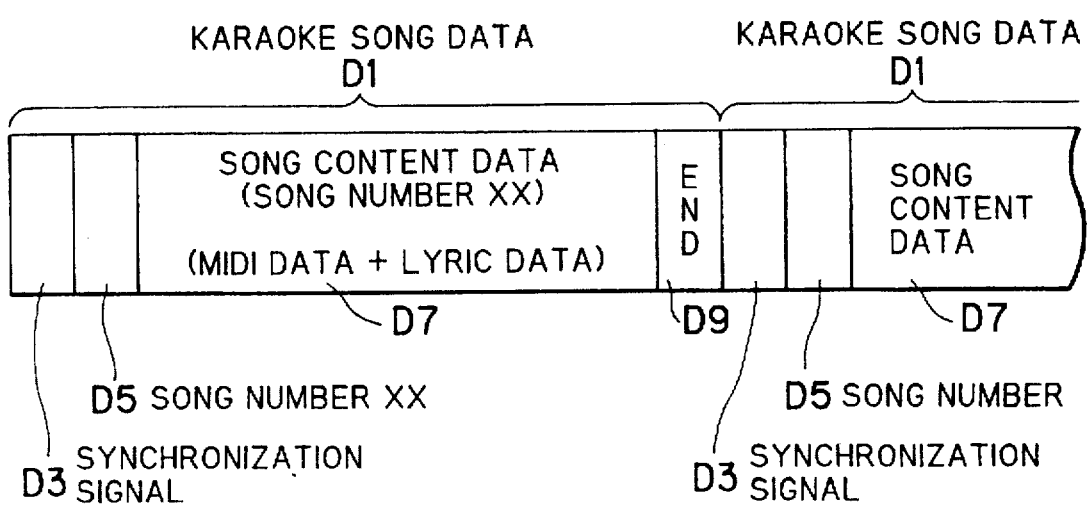
FIG. 4 is an explanatory diagram showing channel structure of the present example.
FIG. 5 is an explanatory diagram showing the structure of karaoke song data according to the present example.

The polling modem 13 modulates the polling signal, outputted by the polling control portion 11, into an alternating current signal of a predetermined channel. More specifically, the polling modem 13 produces the alternating current signal with its frequency being in a predetermined frequency band. The polling modem 13 outputs the modulated polling signal to the head end 25, from which the modulated polling signal is transmitted toward the karaoke terminals 5. In more concrete terms, as shown in FIG. 4, the polling signal is transmitted over a predetermined channel C30.

It is noted that as will be described later, upon receiving the polling signal, each terminal 5 outputs a response signal for responding to the polling signal, which indicates whether or not the terminal 5 desires transmission of karaoke song data from the center 3. The polling modem 13 also performs to receive and demodulate the response signals thus transmitted from the karaoke terminals 5.

The data transmission control portion 15 includes a CPU, a ROM, and a RAM (not shown), in the same manner as does the polling control portion 11, and is connected to the input/output interface 31, the memory device 19, and the background image output devices 21a and 21b via busline 29. Also, the data transmission control 15 is connected to the polling control portion 11 by the input/output interfaces 27 and 31 and a transmission line 33 and can transmit data in both directions.

A large-capacity memory device, such as a hard disk or an magnetooptic disk, is used for the memory device 19. Several thousand songs worth of karaoke song data are stored in the memory device 19. As shown in FIG. 5, one song worth of karaoke song data D1 includes a synchronization signal D3; song number data D5 that indicates the song number; song content data D7; and partition data D9 for indicating the end of the one song worth of data. The song content data D7 includes lyric data, for being projected on a monitor television 53 of the karaoke terminal 5 (to be described later), and instrumental or vocal accompaniment data, for being played by a sound source 45 of the karaoke terminal 5 (also to be described later.) It is noted that the accompaniment data is MIDI (Musical Instrument Digital Interface) standard data.

The data transmission modem 17 is for modulating the karaoke song data retrieved from the memory device 19 into an alternating current signal of a channel (frequency band) that differs from the channel (frequency band) over which the polling signals are transmitted. That is, as shown in FIG. 4, the karaoke song data is modulated to be transmitted over a channel C32 that differs from the channel C30 over which the polling signals are transmitted. The data transmission modem 17 outputs the thus modulated karaoke song data to the head end 25, which in turn transmits the karaoke song data over the channel C32 to a karaoke terminal 5 that has requested the center 3 to transmit the karaoke song data thereto.

The background image output devices (video disk players) 21a and 21b are for outputting background image data (video signals according to standard National Television System Committee (NTSC) system) for projecting on the monitor television 53 of each karaoke terminal 5 (to be described later). The background image data are categorized according to genre of the karaoke songs requestable by the terminals 5. In this concrete example, one output device 21a may store image data of images directed toward Japanese ballads (Enka), and the other output device 21b may store image data of images directed toward popular songs. Each of the background image output devices 21a and 21b is connected to an individual modulator 35. The image data from each of the background image output devices 21a and 21b is modulated by the corresponding modulator 35 into alternating current signals of different channels C33 and C34 as shown in FIG. 4, before being outputted to the head end 25. It is noted that the channels (frequency bands) C33 and C34 are different from the channels C30 and C32. It is further noted that each of the output devices 21a and 21b always outputs the corresponding background image data. Accordingly, the background image data are always transmitted through the channels C33 and C34 to the terminals 5.

The broadcast satellite reception system 23 includes a reception antennae 36, a broadcast satellite tuner 37, and a modulator 39. The modulator 39 is connected to the head end 25. The broadcast satellite tuner 37 is selected to output broadcast satellite signals including broadcast satellite image signals and broadcast satellite sound signals. The modulator 39 modulates the broadcast satellite signals from the tuner into alternating current signals of a channel C35 as shown in FIG. 4, before being outputted to the head end 25. It is noted that the channel (frequency bands) C35 is different from the channels C30 and C32–34. It is further noted that the tuner 37 always outputs the broadcast satellite signals. Accordingly, the broadcast satellite signals are always transmitted through the channel C35 to the terminals 5.

The head end 25 includes a variety of devices (not shown) such as a mixer for mixing signals inputted thereto and for outputting the mixed signals to the coaxial cable 7. More specifically, the head end 25 has inputted thereto the polling signals from the polling modem 13; karaoke song data from the data transmission modem 17; background image signals from the modulators 35; and broadcast satellite signals from the modulator 39 which have been modulated into the different channel signals of the channels C30 and C32–C35. The head end 25 multiplexes the plurality of different channel signals before outputting them to the coaxial cable 7, along which they are transmitted to the karaoke terminals 5.

Figure 3:
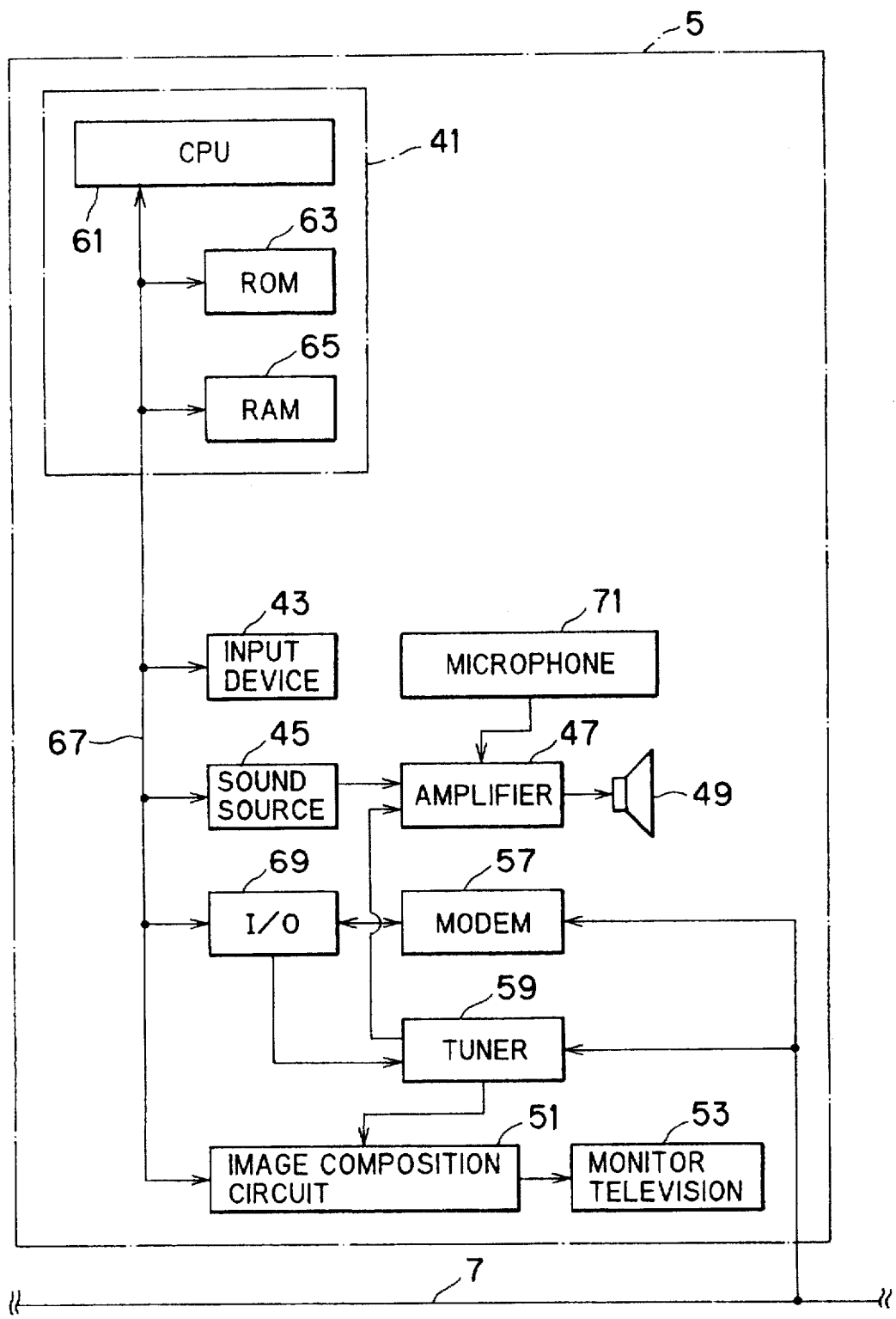
FIG. 3 is a block diagram showing the structure of a karaoke terminal of the concrete example of the present embodiment.

Next, an explanation of the structure of each karaoke terminal 5 will be provided while referring to FIG. 3.

Each karaoke terminal 5 includes a control portion 41 for overall control of the terminal 5, an input device 43, a sound source 45, an amplifier 47, a speaker 49, an image composition circuit 51, a monitor television 53, a terminal modem 57 for receiving and processing the polling signals and the karaoke song data transmitted through the channels C30 and C32 from the center 3, and a video tuner 59 for switching to connect one of the plurality of channels C33–C35 to receive a desired one of the satellite broadcast signals and the background image signals transmitted from the center 3.

The control portion 41 is for performing overall control of the karaoke terminal device 5 and includes a CPU 61, a ROM 63, and RAM 65. The control portion 41 is connected, via a busline 67, to the input device 43, the sound source 45, an input/output interface 69, the image composition circuit 51, etc.

The control portion 41 produces a response signal when a polling signal is transmitted from the center 3. The response signal is a signal for responding to the center 3 to indicate whether a song request (that is, a request for transmission of karaoke song data) has been made by an user by the input device 43. When a request has been made, request data, which indicates the song number of the requested song, is added to the response signal.

The RAM 65 previously stores song name/song genre information data indicating what type of song each of a plurality of songs requestable by the input device 43 corresponds to. In this concrete example, the song name/song genre information data indicates which of the two song genre: Japanese ballads (Enka); and popular songs each of the requestable songs corresponds to. The RAM 65 also serves to temporarily store karaoke song data of the requested song which has been transmitted from the center 3 through the channel C32.

The input device 43 includes a variety of switches by which a user operates the karaoke terminal 5. More specifically, the input device 43 includes a variety of mode switches (not shown) for selecting between watching a broadcast satellite broadcast or performing a karaoke song; a number pad (ten key) for inputting song numbers of requested karaoke songs; and the like.

The terminal modem 57 is for receiving and demodulating the karaoke song data and the polling signals transmitted from the center 3 via the coaxial cable 7 (channels C30 and C32) and is also for modulating the response signal outputted from the control portion 41 into an alternating current signals of a channel C31 (frequency band) of FIG. 4 and transmitting the modulate response signal to the center 3. Thus, the response signal is transmitted over the channel C31 which is a different channel from the channels C30 and C32–C35 over which the polling signals are transmitted.

The video tuner 59 is for receiving a broadcast satellite signal, outputted from the broadcast satellite reception system 23 and transmitted from the center 3, and background image signals, outputted from the background image output devices 21a and 21b and transmitted from the center 3. The video tuner 59 is controlled by the control portion 41 to select either one of the channels C33–C35 to receive desired signals.

A microphone 71 is provided in each terminal 5 to produce a singing voice signal when a user sings into the microphone 71.

The sound source (synthesizer sound source) 45 is for converting the MIDI data (accompaniment data), included in the karaoke song data of FIG. 5, into a karaoke accompaniment signal.

The amplifier 47 is for receiving both the karaoke accompaniment signal from the sound source 45 and the singing voice signal from the microphone 71. The amplifier 47 mixes the karaoke accompaniment signal and the singing voice signal, amplifies the mixed signal, and outputs it to the speaker 49. The amplifier 47 is also for receiving, from the tuner 59, the broadcast satellite sound signal included in the broadcast satellite signal.

The image composition circuit 51 converts lyric data of FIG. 5, included in the karaoke song data, into a lyric image signal, superimposes it onto a background image signal inputted from the video tuner 59, and outputs it to the monitor television 53. The image composition circuit 51 is also for receiving, from the tuner 59, the broadcast satellite image signal included in the broadcast satellite signal.

Next, an explanation of operation of the karaoke system 1 having the above-described structure will be provided.

First, an explanation of the operation of the center 3 will be provided. In the center 3, the polling control portion 11 performs polling control processes shown in the flow chart of FIG. 6 so as to execute polling to all the terminals 5 in succession over the predetermined channel C30. Simultaneously, the data transmission control portion 15 performs data transmission processes shown in the flowchart of FIG. 7 so as to transmit karaoke song data to a terminal that has requested the center 3 to transmit the karaoke song data.

First, the polling control processes will be described with referring to FIG. 6. In the polling control processes, the polling control portion 11 first sets the terminal number n to 1, in step S11. Then, the polling control portion 11 produces a polling signal added with the address code indicating the terminal number n. The polling modem 13 modulates the polling signal and outputs it over the channel C30 toward all the terminals 5. Upon receiving the polling signal, each of the karaoke terminals 5 refers to the address code attached to the polling signal to determine whether this polling signal is for itself. Accordingly, the number n terminal 5 determines that the polling signal added with the address code of the corresponding terminal number n is for itself.

Then, in step S15, the polling modem 13 receives and demodulates a response signal which has been transmitted over the channel C31 from the number n karaoke terminal 5 in response to the polling signal. In step S17, the polling control portion 11 judges, based on the response signal, whether a request for a song has been made at the number n karaoke terminal 5. When a request has been determined as made, the control portion 11 transmits the request data (information on the requested song number, etc.), included in the response signal, to the data transmission control portion 15 in step S19, and the program proceeds to step S21. On the other hand, if a request is determined not to have been made in step S17, the program proceeds directly to step S21.

Next, the terminal number n is incremented by one (n=n+1) in step S31. The control portion 11 judges whether the newly set terminal number n is greater than the maximum terminal number N (i.e., the total number of the karaoke terminals 5 connected to the center 3), in step S23. If not, the program returns to step S13, and the processes in steps S13 through S21 are repeated on the number n+1 karaoke terminal 5. On the other hand, when the number n is determined as greater than N in step S23, the program returns to step S11, where the terminal number n is reset to 1, and the steps S13 through S23 are again performed from the number 1 terminal. Thus, polling is performed in succession on all of the number 1 through N terminals, and then when polling has been completed on all of the terminals, polling is again performed from the number 1 terminal.

Next, the data transmission control processes executed by the control portion 15 will be described while referring to FIG. 7. In the data transmission control processes, the data transmission control portion 15 first judges whether the control portion 15 receives the above-described request data from the polling control portion 11, in step S31. If request data has not yet been transmitted, the step S31 is repeated again and the program waits for reception of the data. On the other hand, when the control portion 15 receives the request data, the control portion 15 retrieves karaoke song data of the requested song from the memory device 19, referring to the request data (requested song number), in step S33. Then, in step S35, the control portion 15 transfers the retrieved karaoke song data to the data transmission modem 17 via the busline 29 and the input/output interface 31.

It is noted that in this step S35, the control portion 15 adds an address code indicating the terminal number n to the karaoke song data in the form as shown in FIG. 5, similarly to the polling signal. The modem 17 modulates the karaoke song data and outputs it toward all the terminals 5. Upon receiving the karaoke song data, each of the karaoke terminals 5 refers to the address code attached thereto to determine whether this karaoke song data is for itself. Accordingly, the number n terminal 5 determines that the karaoke song data added with the address code of the corresponding terminal number n is transmitted for itself. Thus, the karaoke song data of the requested song is transmitted to the karaoke terminal that has requested the song.

It is further noted that the modem 17 transmits the karaoke song data over the channel C32, which is different from the channels C30 and C31 over which the above-described polling signals and the response signals are transmitted. Accordingly, the karaoke song data transmission operation can be performed even while the polling control portion 11 is transmitting the polling signals to the karaoke terminals 5 via the coaxial cable 7.

When the data transmission operation of the step S35 is completed, the program returns to the step S31, and the steps S31 through S35 are repeated in the same manner as described above, so as to successively transmit karaoke song data to the terminals 5 that have requested to transmit the corresponding karaoke song data.

Next, operations in each karaoke terminal 5 will be described.

Figure 8:
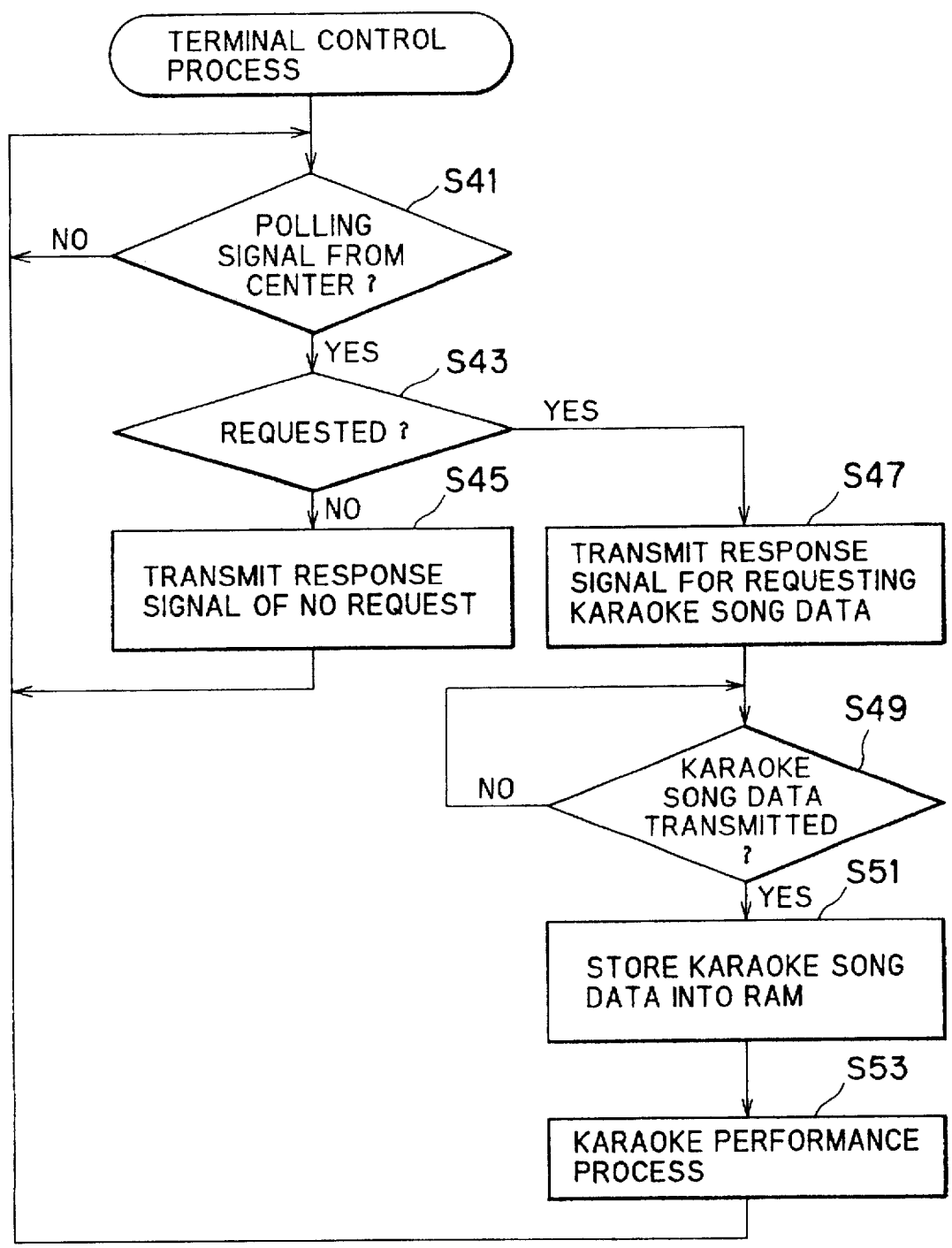
FIG. 8 is a flowchart of terminal control processes executed in each karaoke terminal.

Each karaoke terminal executes terminal control operation shown in the flow chart of FIG. 8. In this control process, the CPU 61 first judges whether polling has been transmitted from the center 3 in step S41. In other words, the CPU 61 judges whether a polling signal attached with the address code of the corresponding terminal number has been transmitted. If no polling signal has been transmitted, the program repeats the step S41 and thereby waits for transmission of the polling signal. On the other hand, when a polling signal has been transmitted to the terminal, the CPU 61 judges whether a song request has been made at the input device 43 in step S43. In other words, the CPU 61 judges whether a requested song number has been inputted by the input device 43. If not, the CPU 61 produces a response signal indicating that no request has been made. The modem 57 modulates the response signal and transmits it to the center 3 over the channel C31 in step S45. Then, the program returns to the step S41.

On the other hand, when a request is determined to have been made in the step S43, the CPU 61 produces a response signal requesting transmission of karaoke song data of the requested song. It is noted that the response signal is attached with the request data indicating the song number of the requested song. The modem 57 modulates the response signal and transmits it to the center 3 over the channel C31 in step S47. Then, the CPU 61 judges, in step S49, whether the requested karaoke song data is transmitted from the center 3 in response to the response signal. If no transmission, the step S49 is repeated and the program thereby waits for transmission of the karaoke song data. On the other hand, when the karaoke song data has been transmitted, the CPU 61 temporarily stores the karaoke song data in the RAM 65 in step S51. Then, the CPU 61 performs karaoke performance processes in step S53.

In the karaoke performance process of the step S53, the CPU 61 controls the video tuner 56, based on the song name/song genre information stored in the RAM 65, so as to cause the video tuner 56 to select a channel over which the background image signal corresponding to the genre of the requested song is transmitted. The background image signal thus received by the video tuner 56 is inputted to the image composition circuit 51. The CPU 61 retrieves the karaoke song data from the RAM 65, and inputs the lyric data included in the karaoke song data to the image composition circuit 51 where the lyric data is converted to a lyric image signal. The image composition circuit 51 superimposes the background image signal and the lyric image signal and displays, on the monitor television 53, the character strings of lyrics superimposed on the background image.

The CPU 61 transfers the MIDI data (accompaniment data) included in the karaoke song data to the sound source 45 where the MIDI data is converted to an accompaniment signal. The accompaniment signal is inputted to the amplifier 47. The accompaniment signal is mixed with the voice signal produced at the microphone 71 into which a user sings. The resultant signal is amplified to an appropriate level and outputted by the speaker 49.

When the karaoke performance process of the step S53 is completed, the program returns to the step S41 and the processes S41 through S53 are repeated.

As apparent from the above, in the karaoke system of the present embodiment, the polling control portion 11 of the center 3 transmits, via the modem 13, a polling signal over a predetermined channel to the karaoke terminals 5. The polling control portion 11 also receives, via the modem 13, the response signals transmitted from the karaoke terminals 5 in response to the polling signals. Based on the request data included in the response signals, the data transmission control portion 15 of the center 3 transmits, over a channel that differs from the channel over which the polling signals are transmitted, karaoke song data of the requested songs to the karaoke terminals 5 that have requested the transmission of the karaoke song data of the requested songs.

As a result, the center 3 can transmit the polling signals over the coaxial cable 7 to the karaoke terminals 5 even while transmitting karaoke song data thereto. Therefore, polling is not interrupted by transmission of the karaoke song data. Accordingly, the center 3 can be quickly accessed from the karaoke terminals 5 and desired karaoke song data can be received in a short waiting time. This has the great advantage that a user can immediately enjoy karaoke entertainment.

While the invention has been described in detail with reference to a specific embodiment thereof, it would be apparent to those skilled in the art that various changes and modifications may be made therein without departing from the spirit of the invention.

Figure 6:
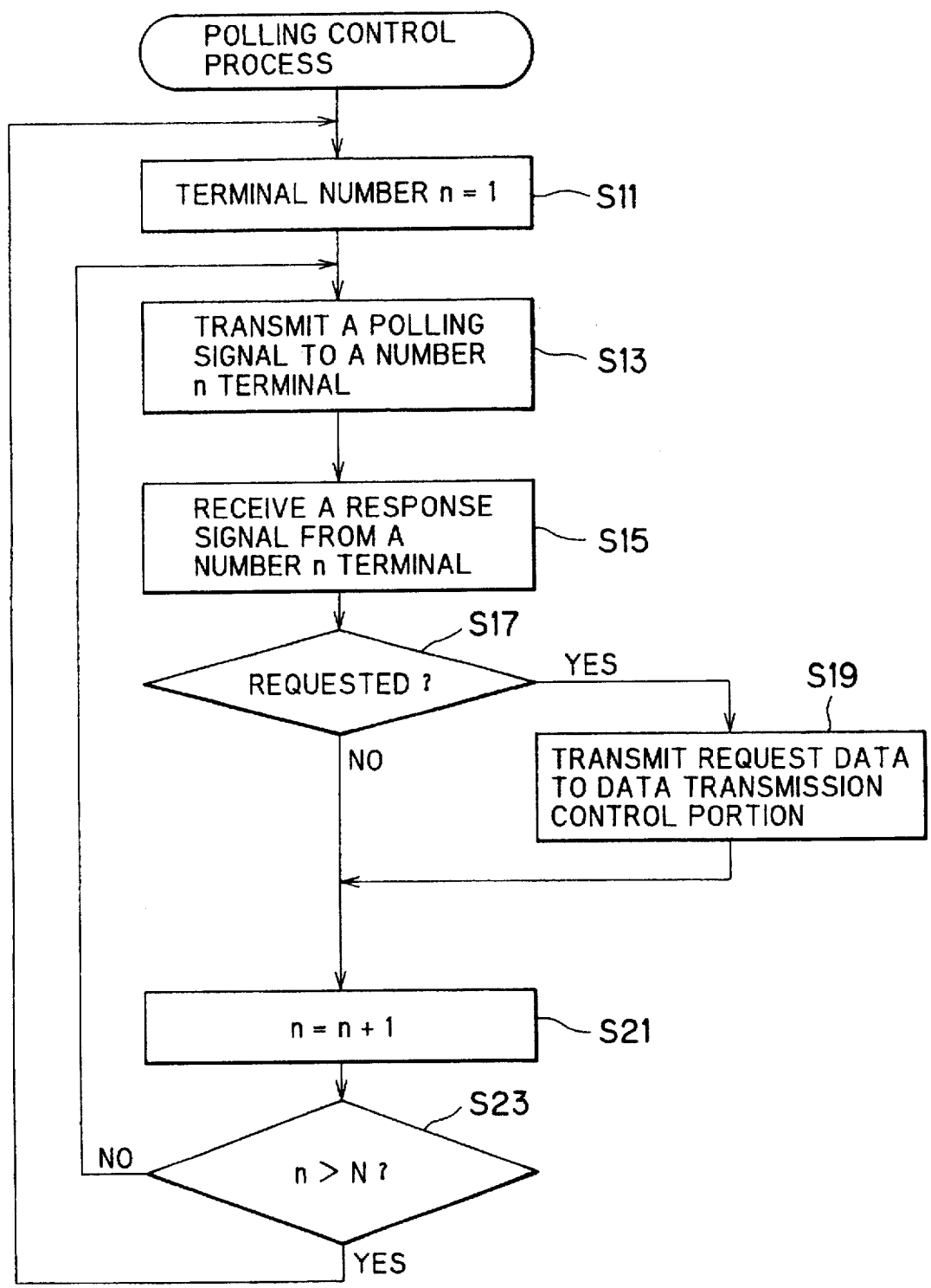
FIG. 6 is a flowchart of polling control processes executed in the center.
Figure 7:
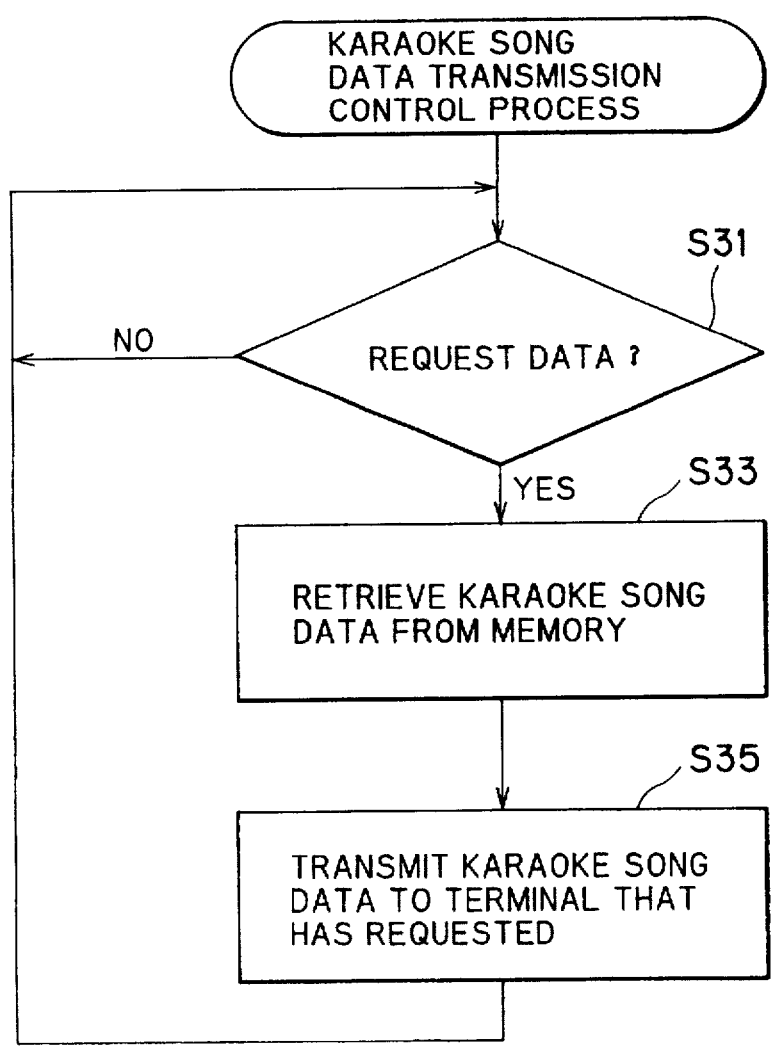
FIG. 7 is a flowchart of data transmission control processes executed in the center.

For example, in the above-described embodiment, the polling control processes shown in FIG. 6 and the data transmission control processes shown in FIG. 7 are executed independently by the two control portions: the polling control potion 11; and the data transmission control portion 15. However, only one control portion with a single CPU need be provided to execute both the polling control processes and the data transmission control processes by multitask processes and the like. By configuring the center 3 in this way, the configuration of the center 3 becomes simpler and is therefore desirable.

The present invention is not limited to application to a karaoke system but can also be applied to systems for providing various types of information such as weather reports and traffic information.

In the data transmission system according to the present inventions as described above, the polling signal transmission unit of the central control unit transmits a polling signal over a predetermined channel to the terminals. Also, the data transmission unit transmits information data to the terminals that have requested the transmission, over a channel different from the channel over which the polling signals are transmitted. As a result, polling signals can be transmitted to the terminals over the transmission line even while information data are being transmitted. Therefore, polling is not interrupted by transmission of data. Accordingly, the central control unit can be quickly accessed from the terminals and there is the advantage that desired information data can be received in a short waiting time.

What is claimed is:

1. A karaoke system for controlling transmission of information data via a transmission line from a central control unit to a plurality of terminals, the karaoke system comprising:

a central control unit; and a plurality of terminals connected to the central control unit via a transmission line, wherein said central control unit comprises polling signal transmitting means for successively transmitting polling signals to the plurality of terminals, via the transmission line, over a predetermined channel, wherein each of the plurality of terminals comprises, request signal transmitting means for transmitting an information transmission request signal via the transmission line to the central control unit, in response to the received polling signal, when the each terminal desires transmission of an information data from the central control unit, wherein the request signal transmission means of each of the terminals desiring the transmission of a desired information data transmits the information transmission request signal attached with a code indicating the information data desired by the terminal, song selecting means for selecting a karaoke song desired to be sung from a plurality of karaoke songs, and processing means for processing lyric data and accompaniment data of the information data transmitted from said central control unit, to thereby display a lyric image for the selected karaoke song and play an accompaniment sound for the selected karaoke song, wherein the central control unit further comprises, data transmission means for transmitting, via the transmission line over a channel different from the predetermined channel, the information data to each of the terminals that has transmitted the information transmission request signal, information transmission request signal receiving means for receiving the information transmission request signals transmitted from the terminals, judging means for judging whether each of the plurality of terminals requests the transmission of the information data, data storing means for storing a plurality of information data, each information data having the lyric data and the accompaniment data for a corresponding one of the plurality of karaoke songs selectable by the song selecting means, and data selecting means for selecting the desired information data from the plurality of information data, in accordance with the code attached to the information transmission request signal, the data transmission means transmitting the selected information data to the corresponding terminal, wherein the polling signal transmission means continually and repeatedly transmits the polling signals in succession to all of the plurality of terminals regardless whether the data transmission means transmits the information data to the terminals, and wherein the polling signal transmission means includes first modulating means for modulating the polling signals into alternating current signals of a first predetermined frequency band and the data transmission means includes second modulating means for modulating the information data into alternating current signals of a second predetermined frequency band different from the first predetermined frequency band, and output means for multiplexing the polling signals modulated by the first modulating means and the information data modulated by the second modulating means and for outputting the multiplexed signals to the transmission line, along which the multiplexed signals are transmitted toward the plurality of terminals.

2. A karaoke system as claimed in claim 1, wherein the processing means is connected to a microphone capable of producing a singing voice signal when a user sings into the microphone, the processing means can play a voice sound based on the singing voice signal with the accompaniment sound.

3. A karaoke device for transmitting information data via a transmission line to a plurality of terminals, in response to requests by the plurality of terminals, the karaoke device comprising:

data storing means for storing a plurality of information data for a plurality of karaoke songs, each information data having lyric data and accompaniment data for a corresponding karaoke song;

polling signal transmission means for successively transmitting polling signals to a plurality of terminals over a first transmission line, via a transmission line, to thereby detect whether each of the plurality of terminals desires transmission of information data, each of the plurality of terminals producing, in response to the received polling signal, a response signal indicating whether the terminal desires transmission of information data, the response signal being attached to a code indicative of information data representing a karaoke song desired by the terminal when the terminal desires to receive a karaoke performance for a desired karaoke song;

response signal receiving means for receiving the response signals transmitted from the terminals;

judging means for judging whether each of the plurality of terminals requests transmission of information data;

data selecting means for selecting a terminal's desired information data from the plurality of information data, in accordance with the code attached to the response signal;

data transmission means for transmitting, over a second channel different from the first channel, the selected information data to each of the terminals that has transmitted the response signal attached to the code indicative of the selected information data, whereby the terminal processes the received information data to thereby display a lyric image for the desired karaoke song and play an accompaniment sound for the desired karaoke song, wherein the polling signal transmission means continually and repeatedly transmits the polling signals in succession to all of the plurality of terminals regardless of whether the data transmission means is transmitting the information data to the terminals, and wherein the polling signal transmission means includes first modulating means for modulating the polling signals into alternating current signals of a first predetermined frequency band and the data transmission means includes second modulating means for modulating the information data into alternating current signals of a second predetermined frequency band different from the first predetermined frequency band; and output means for multiplexing the polling signals modulated by the first modulating means and the information data modulated by the second modulating means and for outputting the multiplexed signals to the transmission line, along which the multiplexed signals are transmitted toward the plurality of terminals.

4. A method of controlling transmission of information data in a karaoke system via a transmission line from a central control unit to a plurality of terminals, the central control unit storing a plurality of information data for a plurality of karaoke songs, each information data having lyric data and accompaniment data for a corresponding karaoke song, the plurality of terminals being connected to the central control unit via the transmission line, the method comprising the steps of:

successively transmitting polling signals from the central control unit to the plurality of terminals, via the transmission line, over a first channel;

transmitting, via the transmission line, an information transmission request signal, from each of the terminals that desires the transmission of information data corresponding to a desired karaoke song, to the central control unit in response to the received polling signal, the information transmission request signal indicating that the corresponding terminal desires the transmission of the information data from the central control unit;

selecting, at the central control unit, the desired information data from the plurality of information data, in accordance with the received information transmission request signal;

transmitting the information data from the central control unit to each of the terminals that have transmitted the information transmission request signals, via the transmission line, over a second channel different from the first channel; and processing, at the terminal, the received lyric data and accompaniment data of the information data transmitted from the central control unit, to thereby display a lyric image for the desired karaoke song and play an accompaniment sound for the desired karaoke song, wherein the polling signals are continually and repeatedly transmitted from the central control unit in succession to all of the plurality of terminals regardless of whether information data is being transmitted from the central control unit to the terminals, and wherein the polling signals are modulated into alternating current signals of a first predetermined frequency band and the information data is modulated into alternating current signals of a second predetermined frequency band different from the first predetermined frequency band, wherein the modulated polling signals and information data are multiplexed and output to the transmission line, along which the multiplexed signals are transmitted toward the plurality of terminals.

* * * * *